Nov. 29, 1938.   H. T. PLATZ   2,138,388
WELDING ELECTRODE
Filed Dec. 6, 1937

INVENTOR
HENRY T. PLATZ
BY
ATTORNEYS

Patented Nov. 29, 1938

2,138,388

UNITED STATES PATENT OFFICE 2,138,388

WELDING ELECTRODE

Henry T. Platz, Detroit, Mich., assignor to Briggs Manufacturing Company, Detroit, Mich., a corporation of Michigan Application December 6, 1937, Serial No. 178,370

2 Claims. (Cl. 219—4)

This invention relates to improvements in electrodes for welding machines, and has as its objects to simplify, render more efficient and improve generally devices of this character.

One of the important objects of this invention is to provide a welding electrode which may have renewal tips replacing the original tip after it is worn away in use.

A further object of the invention is to provide a welding tip which is of uniform diameter throughout its length, so that its action will be uniform throughout the life of the tip.

A further object of the invention is to provide a welding electrode and tip in which the tip is of uniform diameter less than the diameter of the electrode proper, so that the operator can by mere inspection determine the remaining useful life of the tip.

A still further object of the invention is to provide a welding electrode and tip in which a central passage is provided for the circulation of the cooling water, the passage being of uniform diameter throughout so as to prevent the formation of pockets in the circulating fluid.

A further object of the invention is to provide a welding electrode and tip in which the tip is formed to provide maximum conductivity from the extreme active end portion to the portion adjacent the free and unrestricted flow of cooling fluid.

The foregoing, as well as other objects, will be made more apparent as this description proceeds, especially when considered in connection with the accompanying drawing, wherein Fig. 1 is a fragmentary sectional view of a portion of a welding machine showing my improved welding electrode and tip associated therewith;

Figure 1:
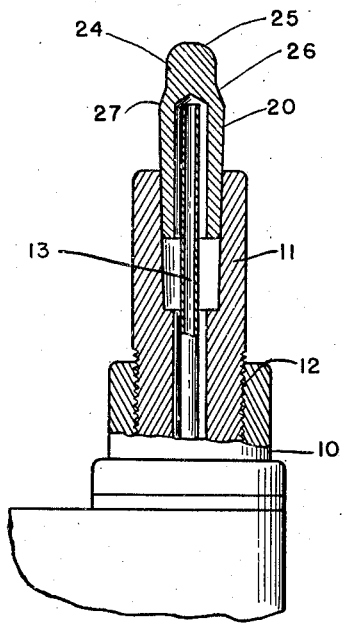

Referring now to the drawing and more especially to Fig. 1, there is illustrated a portion of a welding machine 10 having an electrode holder 11 secured thereto, as for example by means of screw threads 12. A tube 13 is provided through which a cooling medium such as water is introduced. This cooling medium, as can be seen in Fig. 1, circulates freely within the cavity 23 without the formation of pockets. The electrode 20 shown in Fig. 1 is shown enlarged in Fig. 2. This electrode 20 comprises a main cylindrical portion 21 which is slightly tapered at its rear portion 22 to provide for wedging engagement within the electrode holder 11. The body portion of the electrode is recessed at 23, the recess being continuous and of uniform diameter throughout, except for the tapered top which results from the drilling operation. This electrode has an integral tip portion 24 which is of uniform diameter throughout its length and is slightly rounded at its forward surface as indicated at 25. This tip is of materially smaller diameter than the main portion of the electrode 21 and as a result an inspection of the electrode in use will indicate to the operator the remaining useful life of the electrode. In the form illustrated in Fig. 2, the tip portion 24 is connected to the main electrode portion 21 by a conical portion 26.

When the electrode and tip illustrated in Fig. 2 has been expended so that the tip portion 24 is worn away down to or substantially to the conical portion 26, the electrode is removed from the holder and the tip is removed, as by sawing in a screw machine or otherwise, at or below the point 27 which is the juncture of the main electrode portion 21 and the conical portion 26.

Figure 2:
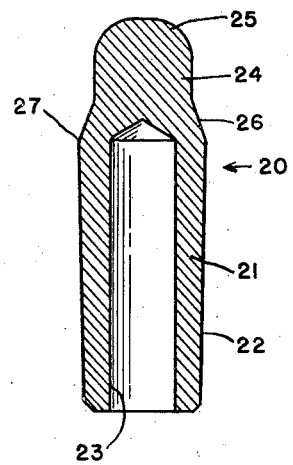
Fig. 2 is an enlarged section of the welding electrode and tip shown in Fig. 1.

The electrode portion 21 is then provided with a new tip indicated at 30 in Fig. 2. This tip 30 has a cylindrical body portion 34 of uniform diameter and is rounded at its forward surface as indicated at 35. It is provided with a projection 37 of a size adapted to be snugly received within the bore 23. This renewal tip is permanently secured in the electrode. For example, a washer 36 of phosphor-copper or the like, is placed between the salvaged end and the new tip, heated as with a torch until the washer melts which results in welding the two parts into a single unit. This may be repeated until the tapered end of the electrode becomes worn out and unusable.

The resulting electrode is therefore effectively integral, so that its conductivity is a maximum, and this result is obtained while retaining the economy resulting from the use of renewal tips.

Figure 3:
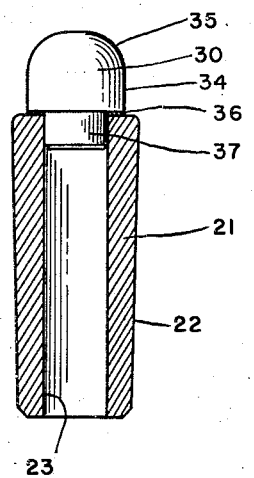
Fig. 3 is an elevation partly in section of the welding electrode shown in Fig. 2, in which the tip has been removed and replaced.

As can be seen in Figs. 2 and 3, the recess 23 is relatively large and need not have reduced portions which are necessitated, in some instances, by the provision of screw threaded securing means. This arrangement provides for free and unrestricted flow throughout the passage and prevents the formation of pockets of cooling fluid which might otherwise be formed. In addition, the integral tip 24 and the replaceable tip 30 are solid and of uniform diameter throughout their useful length so that by a mere inspection of the tip in use, the operator may estimate the remaining useful life of the tip. The disclosed construction also provides for maximum conductivity from the point of weld to the recess 23 which is filled with circulating cooling medium. This provides for maximum cooling of the electrode tip and prevents mushrooming.

The arrangement illustrated also provides for increased economy, since the integral electrode illustrated in Fig. 2 may be formed very economically, and when the tip 24 is expended, it may be removed and replaced with a renewal tip 30 which is itself of a form adapted to be almost completely expendable. The simplicity of the integral electrode and the replaceable tip add materially to the economy of production and in use the waste material is reduced to a minimum.

While I have illustrated a specific embodiment of my invention for clearness of understanding, no unnecessary limitation should be understood therefrom, and the appended claims should be construed as broadly as permissible in view of the prior art.

What I claim as my invention is:

1. The method of renewing welding electrode tips which comprises providing an electrode having a cylindrical bore, and an integral tip having an expendable portion of less outside diameter than said electrode, expending said tip in service, removing the remaining portion of said tip by parting said electrode transversely through said bore, providing a renewal tip having a cylindrical projection of a size to be snugly received in said bore, and securing said projection in said bore.

2. For use with a welding electrode having an integral tip and a smooth cylindrical bore, a renewal tip member having a tip portion and a reduced integral smooth cylindrical projection, said tip portion being similar to the integral tip of the electrode, and said cylindrical projection being of a size to be snugly received in the bore of said electrode when the integral tip of said electrode has been expended and removed.

HENRY T. PLATZ.